S. F. BAUWENS.

BOX BLANK MACHINE.

APPLICATION FILED FEB. 5, 1917.

Reissued June 24, 1919.

14,670.

4 SHEETS—SHEET 1.

Inventor

Seraphine F. Bauwens.

By Emery, Booth, Janney & Varney

Attorney

S. F. BAUWENS.

BOX BLANK MACHINE.

APPLICATION FILED FEB. 5, 1917.

Reissued June 24, 1919.

14,670.

4 SHEETS—SHEET 2.

Inventor

Seraphine F. Bauwens.

By Emery, Booth, Varney & Varney

Attorney

S. F. BAUWENS.

BOX BLANK MACHINE.

APPLICATION FILED FEB. 5, 1917.

Reissued June 24, 1919.

14,670.

4 SHEETS—SHEET 3.

*Inventor:*

*Seraphine F. Bauwens.*

*by Emery, Booth, Yarmey & Vamey*

*Attys*

S. F. BAUWENS.

BOX BLANK MACHINE.

APPLICATION FILED FEB. 5, 1917.

Reissued June 24, 1919.

14,670.

4 SHEETS—SHEET 4.

Inventor

Seraphine F. Bauwens

By Emery, Booth, Janney & Varney

Attorneys.

UNITED STATES PATENT OFFICE.

SERAPHINE F. BAUWENS, OF CHICAGO, ILLINOIS, ASSIGNOR TO WIREBOUNDS CORPORATION, A CORPORATION OF MAINE.

BOX-BLANK MACHINE.

14,670. Specification of Reissued Letters Patent. Reissued June 24, 1919.

Original No. 1,131,460, dated March 9, 1915, Serial No. 610,550, filed February 24, 1911. Application for reissue filed February 5, 1917. Serial No. 146,841.

*To all whom it may concern:*

Be it known that I, SERAPHINE F. BAUWENS, a citizen of the United States, residing at Chicago, county of Cook, and State of Illinois, have invented certain new and useful Improvements in Box-Blank Machines, of which the following is a specification.

My invention relates to improvements in wire-bound box-blank machines and more particularly to a feed mechanism therefor, the object of the invention being to provide an improved feed mechanism which shall be simple of construction and efficient in operation.

A further object of my invention is to provide a variable feed mechanism which is capable of adjustment to suit the varying widths of box-blanks or parts thereof.

Other objects will appear hereinafter.

With these objects in view my invention consists in the novel construction and arrangement of parts all as will be hereinafter more fully described and particularly pointed out in the appended claims.

My invention will be more readily understood by reference to the accompanying drawings forming a part of this specification, and in which, Figure 1 is a top plan view of my improved feed mechanism, the conventional stapling apparatus located above the center of the machine being broken away for clearness of illustration;

Figure 1:
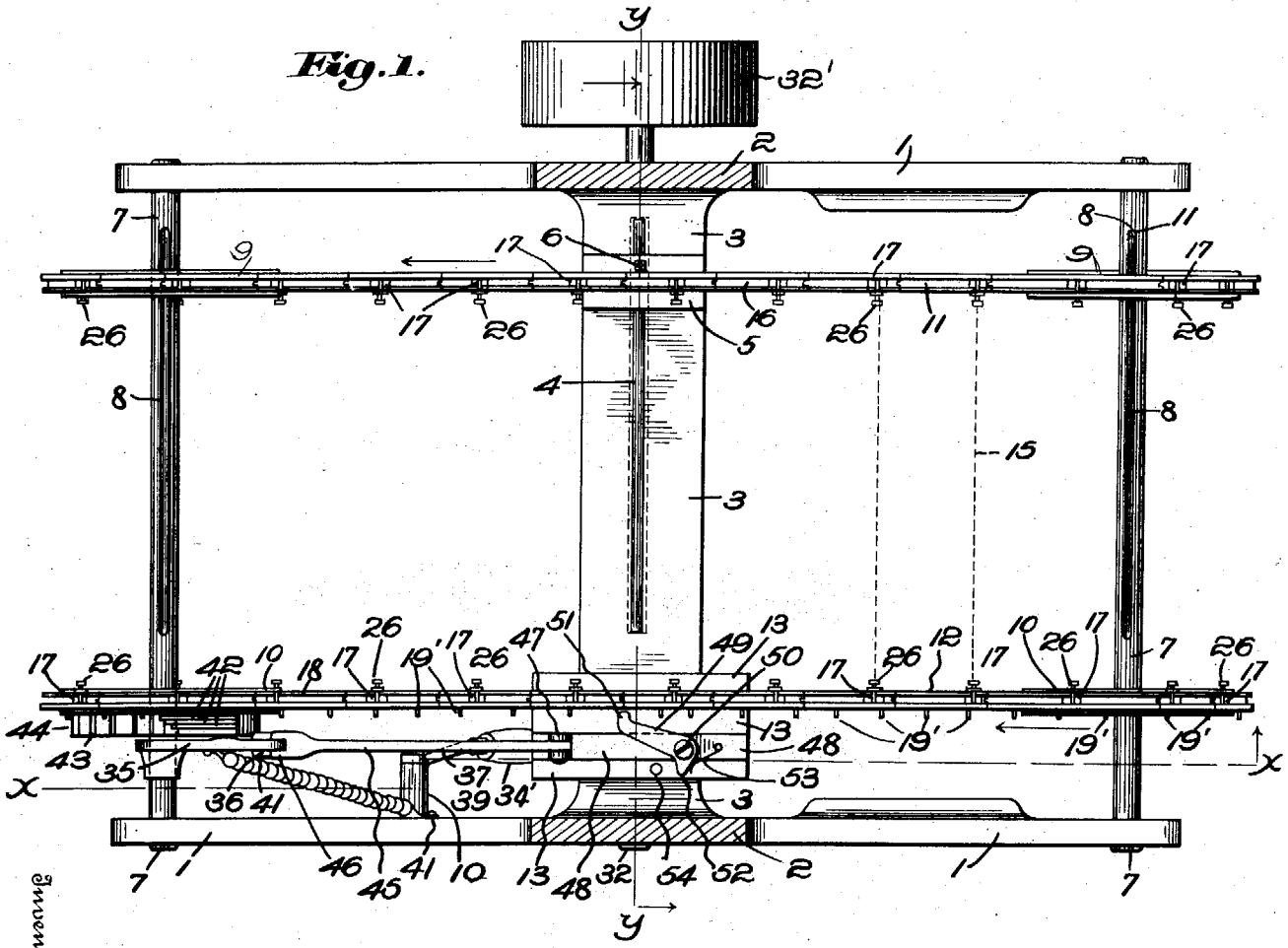

The preferred form of construction of my invention as illustrated in the accompanying drawings comprises a frame 1 having upward extensions 2 by means of which the stapling apparatus, not shown, is supported. A medial transverse member 3 of the frame 1 is preferably although not necessarily provided with a T-slot 4 by means of which a guide-block 5 is readily adjusted transversely, a bolt 6 the head of which projects into said slot being provided to lock any adjustment of said block. Journaled in the frame 1 is a pair of parallel shafts 7 having longitudinal slots 8 whereby a splined connection is effected therebetween and a pair of chain conveyer sprockets 9 mounted thereon. A pair of sprockets 10 which are polygonal in form and corresponding in size with the sprockets 9 are rigidly secured to the shafts 7 and consequently rotate therewith. Said sprockets are of a uniform size and rotate synchronously. A pair of chain conveyers 11 and 12 are mounted for longitudinal movement on the sprockets 9 and 10 respectively, the former being guided in its movement by the guide-block 5, and the latter by a guide-block 13 secured to the member 3 by means of a screw 14.

Figure 4:
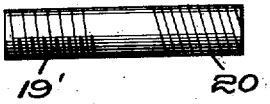
Fig. 4 is a detail elevation of a stud employed in the machine.
Figure 5:
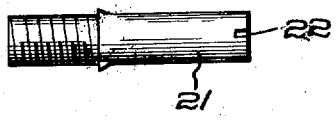
Fig. 5 is a similar view of a modified form of stud.
Figure 6:
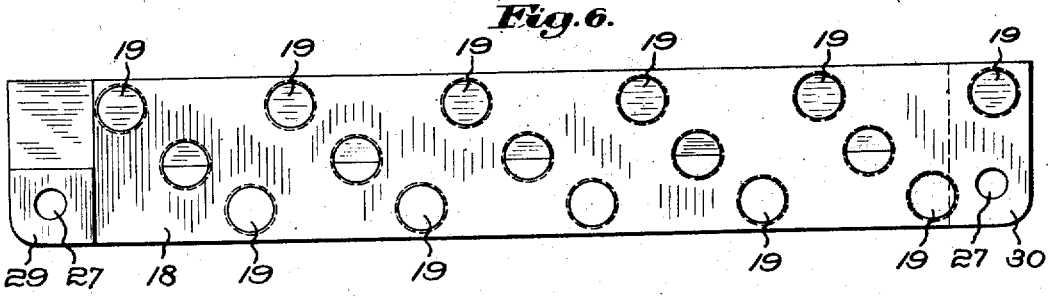
Figs. 6 and 7 are respectively a side elevation and top plan view of a link of a chain conveyer employed in the machine.

A box-blank is indicated by dotted lines 15 in Fig. 1, the spacing of the chain conveyers 11 and 12 being such as to receive blanks of the desired dimension transversely of the conveyers, as will be understood by those skilled in the art. The chain conveyer 11 comprises a series of links 16 which are of a length corresponding with the sides of the sprockets over which the conveyer travels, said links being pivoted together and of such a conformation as to readily receive and hold cleat spacing blocks 17 to be described hereinafter. The links 18 of the chain conveyer 12 are similar to the links 16 with the addition of a series of threaded perforations 19 which are designed to receive threaded studs 19′ having knurled ends 20 as shown in detail in Fig. 4. The modified form of stud 21 having a screw-driver slot 22 may be used if so desired. These studs serve as stops for controlling the intermittent movement of the chain conveyers, as will be explained hereinafter, it being understood that any desired number of studs may be used and so spaced by means of the perforations 19 as to suit the desired disposition of staples on the box-blanks to be run through the machine.

Figure 7:
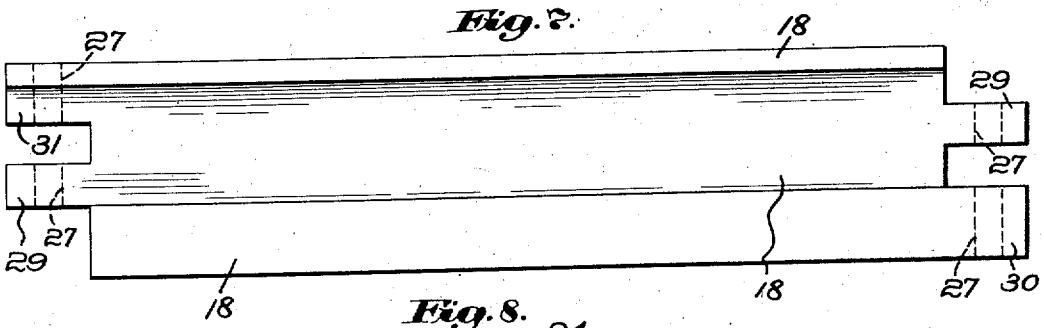
Figure 8:
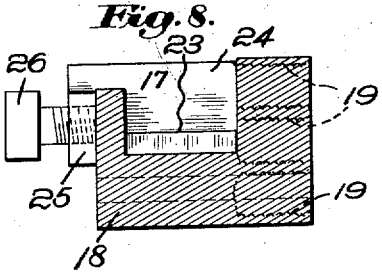
Fig. 8 is a detail transverse section.
Figure 9:
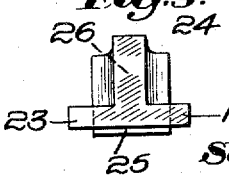
Fig. 9 is a detail elevation.

Each cleat spacing block 17 preferably comprises a rectangular base 23 and a vertical rectangular portion 24 having an overhanging extension 25 which is threaded to receive a locking set-screw 26, as clearly illustrated in Figs. 8 and 9. The links 16 and 18 are of channel form, the channel portion forming a seat for the box cleats, not shown. Each link 18 is provided with pivotal holes 27 for the reception of pivotal pins 28, there being interlocking fingers 29, 30 and 31 provided on the ends of the links as shown in detail in Fig. 7.

In order to drive the chain conveyers 11 and 12 synchronously, a power shaft 32 carrying a driven pulley 32′ is provided, said shaft being driven at a constant speed by power from any available source. Mounted on the power shaft 32 adjacent the end thereof opposite the pulley 32′ is an eccentric cam 33 for actuating the driver of an illustrative ratchet-feed mechanism, the throw of which cam represents the maximum single movement of the intermittently movable chain conveyers 11 and 12. The mechanism for transmitting this movement and any desired lesser movement to the chain conveyers will now be described, this means for transmitting a variable movement constituting the principal feature of the present invention.

The variable feed mechanism comprises a cam roller 34 rotatably mounted in a block 34′ and adapted to travel on the periphery of the cam 33 for transmitting motion to the oscillatory ratchet-driving arm 35 loosely mounted on the shaft 7, there being a rod 36 connecting said block with said arm. The block 34′ is maintained in operative position by means of an oscillatory support 37, a pivotal pin 38 connecting said support to said block and a pivot 39 connecting the same with an inward projection 40 of the frame 1. In this manner motion to the left is transmitted to the arm 35, reference being had to Fig. 2. Return movement or movement to the right is automatically effected by means of a tension helical spring 41, the inherent resiliency of which is only sufficient to move the arm 35, rod 36, block 34′, cam roller 34, and support 37, these parts being light and mounted to move with a minimum of frictional resistance.

Figure 2:
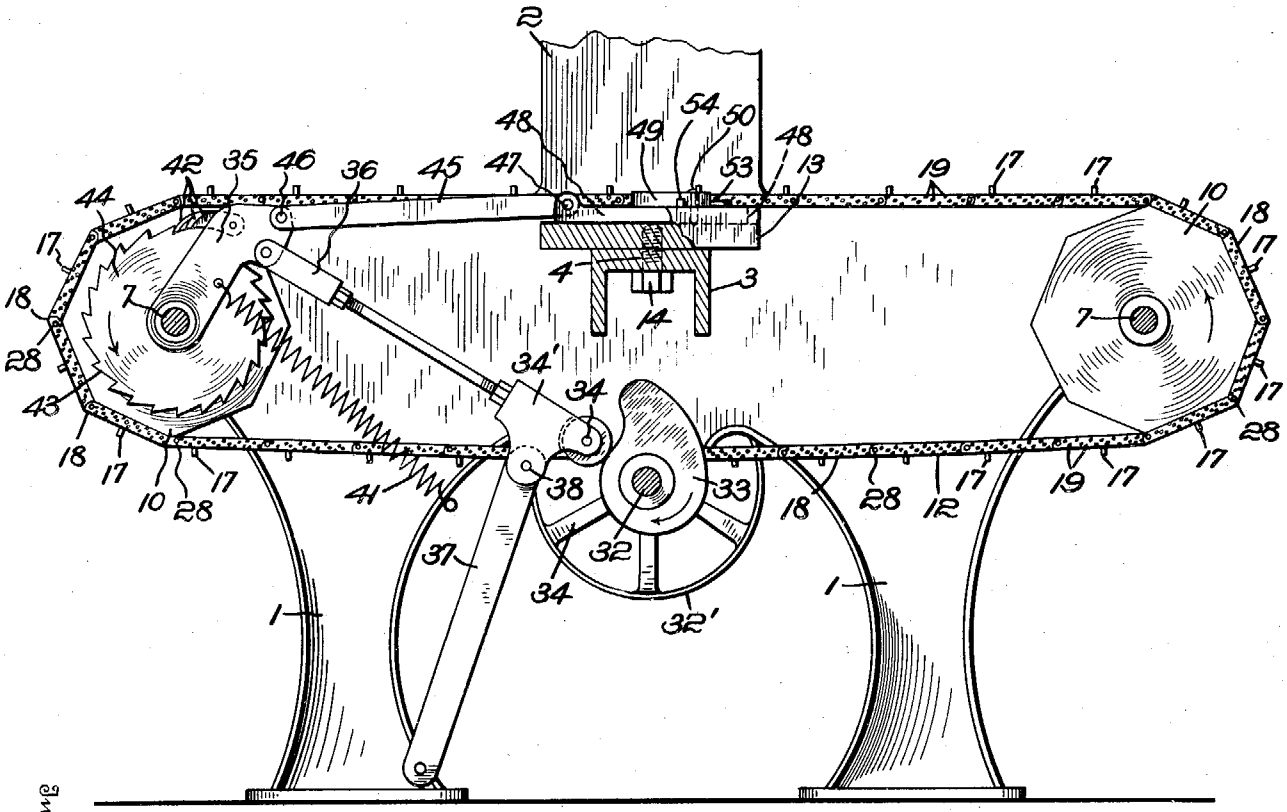
Fig. 2 is a vertical section taken substantially on line $x$—$x$ of Fig. 1.
Figure 3:
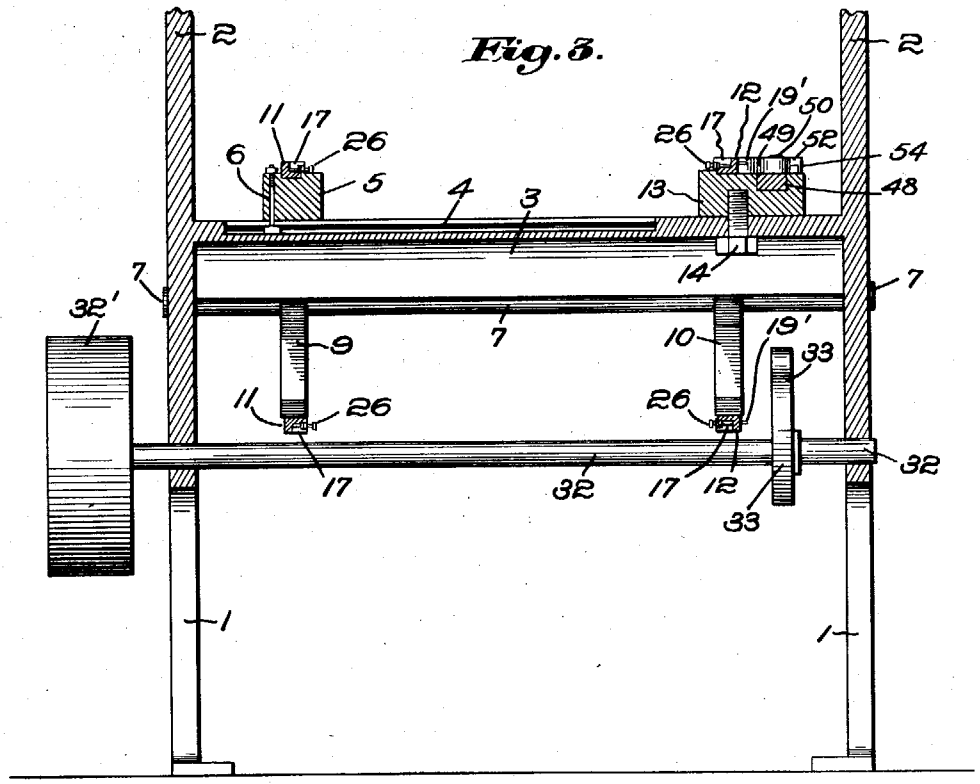
Fig. 3 is a transverse section taken on line $y$—$y$ of Fig. 1.

During the movement of the oscillatory arm 35 to the left motion is transmitted to the chain conveyers by means of a set of pawls 42 one of which automatically engages a tooth 43 of the ratchet wheel 44, the latter being adapted to rotate with a sprocket 10 as illustrated in Fig. 2. Said ratchet may be formed integral with the contiguous sprocket or a rigid connection between the two may be effected, the only requirement being that they rotate synchronously. A link 45 is pivoted to the oscillatory arm 35 at 46 adjacent the rod 36 and extends to the right, as shown in Fig. 2, where a pivotal connection 47 is made with a reciprocatory member 48 which operates on the guide-block 13. To the top of the member 48 and arranged approximately at the center thereof is pivoted a bell-crank 49 by means of the screw 50, said bell-crank comprising a dog 51 at one end and a pawl 52 at the other. A leaf spring 53 is secured to the member 48 and automatically maintains the bell-crank 49 in the normal position as shown in Fig. 1. A stop stud 54 on the member 48 is provided for a purpose to be explained hereinafter.

The operation of the machine is as follows: The stapling apparatus being installed and the longitudinal wires to be stapled to the sheet or other side material or to the cleats being arranged vertically over the chain conveyers, the machine is ready for operation. The operator on each side of the machine places the cleats and sheets in position during the movement of the conveyers, this placing of the sheets and cleats being performed at the right end of the machine, as shown in Fig. 2. Thus the conveyer chains with the spacing blocks thereon provide a circulating work-forwarding means for carrying successively introduced blank sections to the staplers in proper relative positions to be wired. During the passage of the box cleats and sheets laid thereon under the stapling apparatus the wires are stapled in the conventional manner. The scope of this invention being limited to the feed mechanism whereby the box-blank materials are intermittently moved and stopped for the stapling operation, the mechanism for the latter is not illustrated since any well-known type of mechanism may be installed and operated in a manner as will be thoroughly understood by those familiar with machines of this character.

Suppose that, in order to locate a particular staple, a maximum movement of the chain conveyers is desired, then the operative parts will assume the positions as shown in Fig. 2. The cam roller 34′ is in the extreme position to the right and will move to the left during a revolution of the cam 33 which rotates as indicated. The motion will be transmitted to the chain conveyers which will move to the left a distance approximately equal to the throw of the cam 33. When the cam roller 34 passes the highest point of the cam 33 the chain conveyers will stop and the stapling operation will be performed. During this operation the spring 41 will draw the oscillatory arm 35 and the reciprocatory member 48 back to their initial positions providing that the next movement of the chain conveyers is to be a maximum movement as just described. The stapling operation is accomplished during the time of travel between the highest and lowest positions of the cam roller on the cam, the latter having a constant rotary movement as hereinbefore described.

Suppose, further, that in order to locate a particular staple a movement of the chain conveyers less than the maximum is desired. This may be accomplished by suitably arranging the studs 19′ in certain ones of the large number of threaded perforations 19 provided therefor in the chain conveyer 12. The cam roller will not assume the lowest position as shown in Fig. 2 during these lesser movements since the spring 41 will be incapable of returning the reciprocatory member 48 to the position shown. This is due to the fact that the dog 51 will engage a stud 19′ of the chain conveyer before said member 48 has completed a full reverse stroke. It will be apparent that the aforesaid limitation of the power of the spring 41 is desirable to avoid its overcoming the inertia and friction of the conveyer and to insure that the studs on the conveyer chain shall stop the reciprocating member 48 in its reverse movement. The action is explained by assuming that at the beginning of the movement of the chain conveyers to the left that the dog 51 is in contact with a stud 19′ as shown in Fig. 1. Then the chain conveyers and dog 51 will move together to the left until just prior to the completion of the stroke, when the pawl 52 will engage the stationary stop stud 54. The dog 51 will now jump over the stud 19′ by the combined action of the stop stud 54 and the spring 53. The chain conveyers will complete their movement, whereupon the reciprocatory member 48 and the cam roller 34 will be moved to the right by the action of the tension spring 41. The cam roller will not, however, regain the lowest position on the cam as shown in Fig. 2, since the spacing of the next stud 19′ to the right is insufficient to permit of their full movement. The dog 51 during its return movement to the right will engage said stud 19′ and stop the action of the spring 41, it being kept in mind that during the return movement of the reciprocatory member 48 and the cam roller 34 that the chain conveyers are stationary. Now, the next movement of the chain conveyers to the left will be less than the maximum since the cam roller will not engage the cam until after the same has completed a partial revolution. In a simlar manner the succeeding movements of the chain conveyers will be controlled by the locations of the respective studs 19′. So after a given stapling operation, the ensuing feed step, to position the work for the next staple, may be controlled by a stop 19′ brought by the preceding movement to position for coaction with the pawl 51, and thus to determine the effective action of the driving arm 35. Thus each stop 19′ serves to determine the location on the work of a corresponding staple.

In the illustrative machine of the drawings, the construction provides for lost motion in the train of mechanism which produces relative progression between the work and the stapling apparatus. In this instance the lost motion occurs between the cyclically moving cam 33 and the ratchet driver 35 actuated thereby. This opportunity for lost motion permits the extents of steps or intervals of relative progression between consecutive stapling operations to be varied, by causing the respective steps of such progression to consume different fractions of the cycle of the main shaft. And in the illustrative machine it is the location of each stop 19′ that determines the fraction of the cycle of the main shaft consumed in presenting the work in a desired staple-securing position. So in successive cycles of the machine the conveyer chains with the box-blanks positioned thereon will move, in alternation with the stapling operations, successive distances proportional to the cycle fractions respectively determined by the successively presented stops. The stops thus provide a series of controlling members each of which contributes to determine a staple-receiving position of the work; and said stops collectively coöperate to provide in successive cycles a desired disposition of staples on the work.

A variable feed mechanism of the type set forth is not susceptible of easy derangement of parts and is simple in construction and efficient in operation.

As will be evident to those skilled in the art, a machine embodying features of invention described above will be susceptible of operation at comparatively high speed, will require very little attendance by operators, and will be capable of uninterrupted high-speed production of wirebound box blanks or box parts having the wires secured thereto by fastenings applied according to any desired predetermined design. Preferred embodiments of the invention will be capable of operating through an indefinite succession of cycles at high speed while any desired disposition of staples or the like on the work may be determined automatically without attention from the operator and without interrupting the continuity of high speed production of an indefinite succession of work assemblies.

While I have illustrated and described the preferred form of construction for carrying my invention into effect this is capable of variation and modification without departing from the spirit of the invention. I, therefore, do not wish to be limited to the precise details set forth but desire to avail myself of such variations and modifications as come within the scope of the appended claims.

Having described my invention what I claim as new and desire to secure by Letters Patent is:

1. A machine of the class described comprising a conveyer; means for moving said conveyer intermittently; reciprocating mechanism arranged to control the operation of said moving means; and means on said conveyer for controlling said reciprocating mechanism automatically, substantially as described.

2. A machine of the class described comprising a conveyer, means for moving said conveyer intermittently; reciprocating mechanism arranged to control the operation of said moving means; and adjustable means on said conveyer for controlling said reciprocating mechanism automatically, substantially as described.

3. A machine of the class described comprising an endless chain; means for moving said chain intermittently; reciprocating mechanism arranged to control the operation of said moving means; and means on said endless chain for controlling said reciprocating mechanism automatically, substantially as described.

4. A machine of the class described comprising an endless chain; means for moving said chain intermittently; reciprocating mechanism arranged to control the operation of said moving means; and adjustable means on said endless chain for controlling said reciprocating mechanism automatically, substantially as described.

5. A machine of the class described comprising an endless conveyer; means for intermittently moving said conveyer; and means including an adjustable member on said conveyer arranged to control and vary the extent of the effective operation of said moving means, substantially as described.

6. A machine of the class described comprising an endless chain; means for intermittently moving said endless chain; and means including adjustable stops on said endless chain arranged to control and vary the extent of the effective operation of said moving means, substantially as described.

7. A machine of the class described comprising an endless conveyer; means for intermittently advancing said conveyer in one direction only; and means including an adjustable member on said conveyer arranged to control and vary the extent of the effective operation of said advancing means, substantially as described.

8. A machine of the class described comprising an endless chain; means for intermittently advancing said endless chain in one direction only; and means including adjustable stops on said endless chain arranged to control and vary the extent of the effective operation of said advancing means, substantially as described.

9. A machine of the class described comprising a conveyer; a cam; a connection between said cam and said conveyer for driving the latter intermittently; and adjustable stops on said conveyer to limit the extent of the backward or idle movement of the connection whereby the intermittent movements of the conveyer may be made of variable length, substantially as described.

10. A machine of the class described comprising a conveyer; a cam; a cam operated member; a pawl and ratchet connection between said member and conveyer; and adjustable stops on said conveyer arranged to limit the extent of the backward or idle movement of the said member whereby the intermittent movements of the conveyer may be made of variable length, substantially as described.

11. In a machine for making wire-bound and cleat-reinforcing box-blanks, a main frame having a pair of parallel sprocket shafts journaled therein, a pair of chain conveyers adapted to travel over the sprockets of said shaft, a power shaft journaled in said frame, an eccentric cam carried by said power shaft, a cam roller adapted to travel over the periphery of said cam, a ratchet wheel secured to one of said shafts and adapted to impart an intermittent synchronous movement to said conveyers, operative connections between said cam and said ratchet wheel whereby the latter receives the movement imparted by the throw of said cam, adjustable projections on one of said conveyers, and means coöperating with said projections whereby the movement transmitted to the conveyer from said cam may be varied in extent, substantially as described.

12. In a machine for making wire-bound and cleat-reinforcing box-blanks, a main frame having a pair of sprocket shafts journaled therein, a pair of chain conveyers traveling over the sprockets of said shafts, a power shaft journaled in said frame, an eccentric cam carried by said power shaft, a cam roller adapted to travel on the periphery of said cam, means for mounting said cam roller, an oscillatory arm loosely mounted on one of said sprocket shafts and in operative connection with said cam roller, a ratchet wheel secured to the last named sprocket shaft and arranged adjacent said oscillatory arm, a series of pawls pivoted to said oscillatory arm for engaging said ratchet wheel, removable spaced studs on one of said conveyers the links of which are provided with a series of threaded perforations for the reception of said studs, a pivoted spring-pressed bell-crank adapted to engage said studs and to move synchronously with said oscillatory arm, and a stationary stop adapted to cause the oscillation of said bell-crank for disengaging the same from a spaced stud, substantially as described.

13. A machine of the class described comprising a conveyer; a moving driving member; a mechanism adapted to detachably connect the driving member to the conveyer to drive the conveyer in a given direction;

and a member selectively adjustable along the conveyer and adapted to coöperate with said connecting mechanism to vary the movement of the conveyer in accordance with the selected position of said adjustable member on the conveyer.

14. A machine of the class described comprising a conveyer; a moving driving member; a mechanism adapted to detachably connect the driving member to the conveyer to drive it in a given direction; and a plurality of members along the conveyer at various distances one from the other and adapted to successively coöperate with said connecting mechanism to cause the conveyer to be moved a distance proportional to the distance between the then coöperative member on the conveyer and one of the members on the conveyer adjacent to it.

15. A box-blank machine comprising, in combination, coöperating blank-feeding and binding wire applying and fastening mechanisms constructed and arranged to provide a continuously-operating organization for wiring successive blanks without stopping the machine, and fastener-positioning means coöperating with said mechanisms for controllably locating individual fasteners of the respective blanks.

16. In a machine for making wirebound boxes by the action of binding wire applying and fastening mechanism upon blank materials, the combination with said mechanism of blank-feeding means having blank-positioning devices, said blank-feeding means constructed and arranged to permit indefinitely feeding successive blank materials to the machine without interruption of operation, and coöperating means controlling the feed to cause successive presentation of a series of selectively spaced points along successive blanks in position for operation of the fastening mechanism thereat.

17. A box-blank machine comprising, in combination, coöperating blank-feeding and binding wire applying and fastening mechanisms constructed and arranged to provide a continuously-operating organization for wiring successive blanks without stopping the machine, and fastener-positioning means coöperating therewith, said fastener-positioning means automatically controlling the relative position of the work and fastening mechanism for application of the initial fastener of each blank.

18. In a machine for use in making wirebound boxes by the action of fastener-setting mechanism to secure binding wires to box materials, the combination with said mechanism of a step-by-step fed conveyer for said materials, and conveyer-controlled means regulating the feed for effecting a desired disposition of fasteners on the work.

19. In a machine of the class described, the combination of a conveyer for effecting relative progression between fastener-setting mechanism and box materials; a cyclically moving actuator adapted intermittently to impart movements to said conveyer; a plurality of adjustable members arranged for successive action during the travel of the conveyer; and coöperating means controlled thereby in succession, for determining points in successive movements of said actuator at which it becomes effective to move the conveyer.

20. In a machine of the class described, having fastener-setting mechanism to secure binding wire to box parts, means to produce relative step movements between the fastener-setting mechanism and box parts comprising a reciprocable driver, a fixed throw actuator arranged to move said driver in one direction, there being provision for lost motion between said actuator and driver, and a series of successively presented members correlated with relative positions of the work and fastener-setting mechanism effective to determine such lost motion.

21. In a machine of the class described having fastener-setting mechanism to secure binding wire to box materials, a conveyer for feeding such materials step-by-step to the fastener-setting mechanism, a reciprocable driver adapted to impart motion to the conveyer on movement in one direction, a fixed throw actuator, means for normally maintaining said driver and actuator in operative connection, and means rendered effective at times dependent on the position of the conveyer relative to the fastener-setting mechanism for causing lost motion between said actuator and driver.

22. In a machine for making wirebound boxes by the action of fastener-setting mechanism to secure binding wire to assembled box parts, the combination of said mechanism, work-supporting means and feed mechanism to cause relative progression between the work and fastener-setting mechanism, in a continuously-operating organization for wiring a succession of assembled parts for successive boxes; and pattern means having a pattern device corresponding to each of a plurality of selected fastener-receiving points on the work, and means governed thereby for relatively positioning the work and fastener-setting mechanism to insert fasteners at said selected points.

23. In a machine for making wirebound boxes by the action of binding-wire applying and fastener-setting mechanism upon box-forming material progressively subjected to the operation thereof, means for causing relative progression between the work and fastener-setting mechanism in steps of controlled length for applying fasteners according to a desired disposition thereof, which means comprises a cyclically-moving actuator, driven means for relatively advancing the work, and driving means therefor deriving motion from said actuator at different phases of its cycle, and pattern means controlling phases during which motion is derived, thereby effecting regulated feed steps of varied lengths to locate the fasteners as determined by the pattern.

24. In a machine for making wirebound boxes by the action of binding-wire applying and fastener-setting mechanism upon box-forming material, a work support, an actuator, feed mechanism actuated thereby to cause relative progression between the work and fastener-setting mechanism, said feed mechanism including a driver, there being provision for lost-motion between said actuator and said driver, and a series of adjustable controlling members successively determining the amount of lost-motion.

25. In a machine of the class described having fastener-setting mechanism for securing binding-wire to box parts, the combination with said mechanism of work advancing means; means for driving the work-advancing means; and means successively controlled by the position of the work-advancing means relative to said fastener-setting mechanism, for regulating the advance of the work to effect a desired disposition of the fasteners.

26. In a machine of the class described, the combination of a fastener-setting mechanism; a work support; means for producing relative progression between the work and the fastener-setting mechanism, said means including a regulable step feed mechanism having a variable stroke driver; and means including controlling members corresponding to points of application of fasteners determining the individual lengths of successive strokes of said driver.

27. A machine for use in making wirebound boxes comprising, in combination, fastener-setting means for securing binding wire to box parts; work-engaging means; feeding means for producing relative movement therebetween; and means controlled by said relative movement for regulating the action of said feeding means to effect application of fasteners according to a desired disposition on the box parts.

28. A machine for use in making wirebound boxes comprising, in combination, fastener-setting mechanism to secure binding wire to box parts; work-engaging means; means for producing relative progression therebetween; and automatic fastener-positioning mechanism controlled by said relative progression comprising a series of controlling members in a relationship corresponding to desired positions of individual fasteners and moving correspondingly with the work-engaging means and means whereby said members successively control the progression.

29. A machine for use in making wirebound boxes by the action of binding wire applying and fastening mechanism upon assembled box parts, comprising, in combination with said mechanism, means for progressively subjecting thereto successive assemblies of box parts, and coöperating fastener-positioning means for controllably locating individual fastenings on successive assemblies, the machine being organized for continuous operation in wiring successive assemblies of box parts for a plurality of boxes.

30. A machine for use in making wirebound boxes by the action of fastener-setting mechanism to secure binding wire to assembled box parts, comprising, in combination with said mechanism, work-engaging means, step-feed mechanism whereby the work is progressively subjected to the action of said fastener-setting mechanism; and automatic fastener positioning means comprising a series of successively presented controlling members adjustable along the work-engaging means, and means whereby said members control relative movements between the work and fastener-mechanism for definitely locating fasteners.

31. A machine for use in making wirebound boxes by the action of binding wire applying mechanism upon box parts, comprising, in combination, fastener-setting means for securing wire to box parts; and mechanism for producing a succession of predetermined fastener-setting relationships between said fastener-setting means and successive assemblies of box parts, including fastener-positioning means for controllably locating individual fastenings on successive assemblies, the machine being organized for continuous operation in wiring successive assemblies of parts for a plurality of boxes.

32. A machine for use in making wirebound boxes, comprising, in combination, mechanism for fastening binding wire to box parts; and means automatically controllable in operation, including controlling devices therefor, for causing variable relative progression between said mechanism and the work to effect a desired disposition of fasteners on the work; the machine being organized for continuous operation in wiring successive assemblies of box parts for a plurality of boxes.

33. A machine of the class described comprising, in combination, fastener-setting mechanism to secure binding wire to box-parts; work-supporting means; and mechanism including controlling and driving means coöperating to produce controlled relative movements between the work and fastener-setting mechanism to submit selected points on the box parts to the action of the fastener-setting mechanism; said elements constructed and arranged to provide a continuously-operating organization for wiring and controllably locating fasteners on successive assemblies of parts for a plurality of boxes.

34. In a machine of the class described having fastener-setting mechanism to secure binding wire to box parts, the combination of said mechanism; work-supporting means; and mechanism including pattern means and driving means coöperating to produce controlled relative movements between the work and fastener-setting mechanism for locating fasteners as determined by the pattern means; said elements constructed and arranged to provide a continuously-operating organization for wiring successive assemblies of parts for a plurality of boxes.

35. A machine for use in making wire-bound boxes comprising, in combination, fastener-setting mechanism to secure binding wire to box parts; work-supporting means; and mechanism, including a plurality of controlling means corresponding respectively to individual fastener-receiving points on the work, to position relatively the fastener-setting mechanism and work for application of fasteners at the selected fastener-receiving points on the work; said elements constructed and arranged to provide a continuously operating organization for wiring successive assemblies of parts for a plurality of boxes.

36. A machine of the class described comprising, in combination, coöperating binding wire-securing means, work-supporting means, and feed mechanism to cause relative progression between the work and wire-securing means, in a continuously operating organization for wiring successive assemblies of parts for a plurality of boxes; and coöperating means controlling the progression to effect a desired disposition of wire fasteners on successive assemblies.

37. In a machine of the class described having fastener-setting mechanism to secure binding wire to box parts, means for feeding box parts thereto to receive fasteners at successive points on the box parts, comprising driven work-forwarding means, a driver to impart movements thereto, and means to control and vary the extent of movements imparted by the driver between consecutive fastener-setting operations; said elements constructed and arranged to provide a continuously-operating organization for wiring successive assemblies of parts for a plurality of boxes.

38. A machine for use in making wire-bound boxes by the action of binding wire applying mechanism upon box parts, comprising, in combination, fastener-setting means for securing wire to box parts; and mechanism, having work-engaging means, for causing relative progression between said work-engaging means and the fastener-setting means to produce a succession of predetermined fastener-setting relationships between said fastener-setting means and successive assemblies of box parts, including means governed by said relative progression for determining said fastener-setting relationships according to a desired disposition of fasteners on the box parts.

39. A machine for use in making wire-bound boxes by the action of binding wire applying mechanism upon box parts, comprising, in combination, fastener-setting means for securing wire to box parts; and mechanism for causing relative progression between box-parts and the fastener-setting means to produce a succession of predetermined fastener-setting relationships between said fastener-setting means and successive assemblies of box parts, including a plurality of means variably arranged along the work in desired relation respectively to selected fastener receiving points thereon for determining said fastener-setting relationships according to a desired disposition of fasteners on the box parts.

40. A machine for use in making wire-bound boxes by the action of binding wire applying mechanism upon box parts, comprising, in combination, fastener-setting means for securing wire to box parts; and mechanism for causing relative progression between box-parts and the fastener-setting means to produce a succession of predetermined fastener-setting relationships between said fastener-setting means and successive assemblies of box parts, including spacing means having a plurality of members in spaced relation corresponding to desired spaces between fastener receiving points, and a coöperating transmission means, one of said spacing and transmission means being arranged along the work and the other being located to coöperate therewith for effecting said fastener-setting relationships according to a desired disposition of fasteners on the box parts.

41. In a machine of the class described having fastener-setting mechanism to secure binding wire to box parts, means for progressively submitting the work to the fastener-setting mechanism at controlled intervals for applying fasteners according to a desired disposition thereof on the work, which comprises a cyclically moving actuator, driven traveling work-forwarding means, a driver adapted to operate said work-forwarding means during different fractions of the cycle of said actuator, and a plurality of controlling members successively brought into play by the movement of said work forwarding means and successively coöperating with said driver for controllably determining said fractions.

42. In a machine for use in making wire-bound boxes by the action of wire-securing mechanism at successively submitted points on box parts, the combination with said mechanism of means for controllably positioning the work and said mechanism to place an individual fastener as desired, comprising a controlling member adjustable longitudinally of the work and fixed in relation to a desired fastener-receiving point on the work, and means controlled thereby to impart a relative movement between the work and wire-securing mechanism to bring said point to position for operation of the latter thereat.

43. In a machine for use in making wire-bound boxes by the action of fastener-setting mechanism to secure binding wire to box materials, the combination with said mechanism of a traveling conveyer for feeding said materials, and conveyer-controlled means regulating the feed for effecting a desired disposition of fasteners on the work.

44. A machine for use in making boxes, comprising, in combination, fastener-setting means; and mechanism for producing a succession of predetermined fastener-setting relationships between said fastener-setting means and the box parts, including fastener positioning means for controllably locating individual fasteners on the box parts.

45. A machine for use in making boxes, comprising, in combination, fastener-setting means; and mechanism for causing relative progression between the fastener-setting means and the work having means for variably controlling the length of each of a plurality of consecutive intervals of progression between fastener-setting operations.

46. A machine for use in making boxes comprising, in combination, fastener-setting means; work-supporting means; and mechanism including pattern means and a single driving means variably coacting therewith to produce controlled relative movements of varied extent between the work and fastener-setting mechanism for locating fasteners as determined by the pattern means.

47. A machine for use in making boxes comprising, in combination, fastener-setting means; work supporting means; and mechanism including pattern means and actuating means variably coacting therewith to produce variable relative movements between the work and fastener-setting means, each of a plurality of consecutive such movements being separately controllable, for locating fasteners as determined by the pattern means.

48. A machine for use in making boxes comprising, in combination, fastener-setting means; a traveling work holder; and mechanism for presenting the work holder in a succession of predetermined positions relative to the fastener-setting means, including a power driven actuator, and transmitting and controlling means intermediate the actuator and the work holder transmitting variable fractions of successive actuator movements to the work holder for controllably locating individual fasteners.

In witness whereof I have hereunto set my name in the presence of two subscribing witnesses.

SERAPHINE F. BAUWENS.

Witnesses:
ROBERT I. MARSHALL,
CHARLES F. CARPENTER.